United States Patent
Palanisamy et al.

(10) Patent No.: US 10,394,695 B2
(45) Date of Patent: Aug. 27, 2019

(54) METHOD AND SYSTEM FOR RECORDING AND DEBUGGING PROCESS FLOWS

(71) Applicant: Oracle International Corporation, Redwood Shores, CA (US)

(72) Inventors: Muthukumar Palanisamy, Coimbatore (IN); Rajan Modi, Highlands Ranch, CO (US); Adinarayana Bellala, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/986,751

(22) Filed: May 22, 2018

(65) Prior Publication Data

US 2019/0095317 A1   Mar. 28, 2019

Related U.S. Application Data

(60) Provisional application No. 62/562,828, filed on Sep. 25, 2017.

(51) Int. Cl.
G06F 11/36 (2006.01)

(52) U.S. Cl.
CPC ........ G06F 11/3664 (2013.01); G06F 11/362 (2013.01); G06F 11/3684 (2013.01)

(58) Field of Classification Search
CPC .................................................. G06F 11/362
USPC ......................................................... 717/134
See application file for complete search history.

(56) References Cited

U.S. PATENT DOCUMENTS

| | | | | |
|---|---|---|---|---|
| 8,375,372 B2* | 2/2013 | Bennett | | G06F 11/3664 703/22 |
| 9,170,915 B1* | 10/2015 | Fateev | | G06F 11/3414 |
| 2005/0177820 A1* | 8/2005 | Mei | | G06F 11/3664 717/129 |
| 2006/0294158 A1* | 12/2006 | Tsyganskiy | | G06F 8/72 |
| 2007/0050682 A1* | 3/2007 | Takuma | | G06F 11/3652 714/45 |
| 2009/0320002 A1* | 12/2009 | Peri-Glass | | G06F 8/38 717/131 |
| 2013/0227530 A1* | 8/2013 | Zhang | | G06F 11/362 717/129 |
| 2016/0124835 A1* | 5/2016 | Davis | | G06F 11/366 714/38.1 |

(Continued)

OTHER PUBLICATIONS

Matjaz B. Juric; "A Hands-on Introduction to BPEL"; Oracle.com website [full url in ref.] as captured by the Wayback Machine Internet Archive (archive.org) on Oct. 21, 2015 (Year: 2015).*

(Continued)

Primary Examiner — Qing Chen
Assistant Examiner — Clint Thatcher
(74) Attorney, Agent, or Firm — Trellis IP Law Group, PC

(57) ABSTRACT

Implementations include a method and system configured to allow users to track, record, and store process instances and use the recordings in the same or different environments in order to test, debug, and repair detected errors and anomalies in process flows. The method and system also provides a conceptual way where users can create tests by recording and playback one or more flow instances along with processing artifacts in order to test and debug their flow in a different environment to ensure flow executions work across updates, releases, and across different environments.

17 Claims, 14 Drawing Sheets

(56) References Cited

U.S. PATENT DOCUMENTS

2018/0113791 A1* 4/2018 Fink .................... G06F 11/3664
2019/0095317 A1* 3/2019 Palanisamy ......... G06F 11/3664

OTHER PUBLICATIONS

"Recording and Playing Back Process"; Adobe.com website [full url in ref.]; Jul. 11, 2008 (Year: 2008).*

IBM Integration Bus, Version 9.0.0.8 Operating Systems: AIX, HP-Itanium, Linux, Solaris, Windows, z/OS; https://www.ibm.com/support/knowledgecenter/en/SSMKHH_9.0.0/com.ibm.etools.mft.doc/bj23550_.htm—2 pages.

VREST—Automated Rest API Testng Tool; https://vrest.io/—5 pages.

* cited by examiner

METHOD AND SYSTEM FOR RECORDING AND DEBUGGING PROCESS FLOWS

CROSS REFERENCES TO RELATED APPLICATIONS

This application claims the benefit of U.S. Provisional Patent Application Ser. No. 62/562,828, entitled ORACLE ICS LITMUS, filed on Sep. 25, 2017, which is hereby incorporated by reference as if set forth in full in this application for all purposes.

BACKGROUND

The following relates to recording and debugging process flows. More specifically, the following relates to recoding, analyzing, debugging, and repairing instances of process flows at design time and/or runtime.

In systems that utilize Business Process Execution Language (BPEL), users rely on modeling business processes during a design time phase, and then executing the model during run-time for automated process integration between services. Modeling such business process involves providing communication links between internal and external services to support business transactions. During the modeling phase, such communication links and services are represented as node instances used to model the system inputs and outputs.

Since business processes often require multiple communication instances, business models often become quite complex. Unfortunately, conventional testing and debugging of such business complex business process models is arduous and inefficient often requiring extensive user testing. For example, during a model testing cycle, designers may use conventional testing systems and debuggers to try to isolate errors in the model. Notating the errors found and communicating such errors between testing personnel and designers is often difficult as often the design and testing teams are separate functions.

Further, when the integration is imposed on a new or updated environment and errors are discovered, it is often difficult for the designers to recreate the errors found by testing, especially if the errors are due to a third party service that is not readily accessible or serviceable. Moreover, some deign time errors may not be caused by a faulty service, but rather may be the result of normal operation of the connected services that have been misinterpreted or incorrectly processed in the new environment. As such, isolating such misidentified service errors results in wasted time and resources especially if the integration invokes endpoints that are not accessible.

Therefore, what is needed is a system and method that allows a user to execute a model in a working environment, record instances, play back the instances in new and/or modified environment, and utilize the play back and system to capture and correct errors in the new and/or updated integration.

SUMMARY

Implementations include a method and system configured to allow users to track, record, and store process flow instances and use the recordings in the same or different environments in order to test, debug, and repair detected errors and anomalies in process flows. The method and system also provides a conceptual way where users can create tests by recording and playback one or more flow instances along with process artifacts, such as design time artifacts, in order to test and debug their flow in a different environment instance to ensure flow executions work across updates, releases, and across different environments.

In other implementations, to allow flow testing to be complete, the system may be used to detect and emulate designated nodes, such as endpoints, that are not accessible, unresponsive, or otherwise designated as unavailable or inaccessible. The system may also be used to detect whether errors and anomalies are acceptable within an error threshold and may either ignore the errors and anomalies and/or repair them to within an acceptable level of operation relative to the needs of the testing.

A further understanding of the nature and the advantages of particular embodiments disclosed herein may be realized by reference of the remaining portions of the specification and the attached drawings.

DETAILED DESCRIPTION OF EMBODIMENTS

Figure 1:
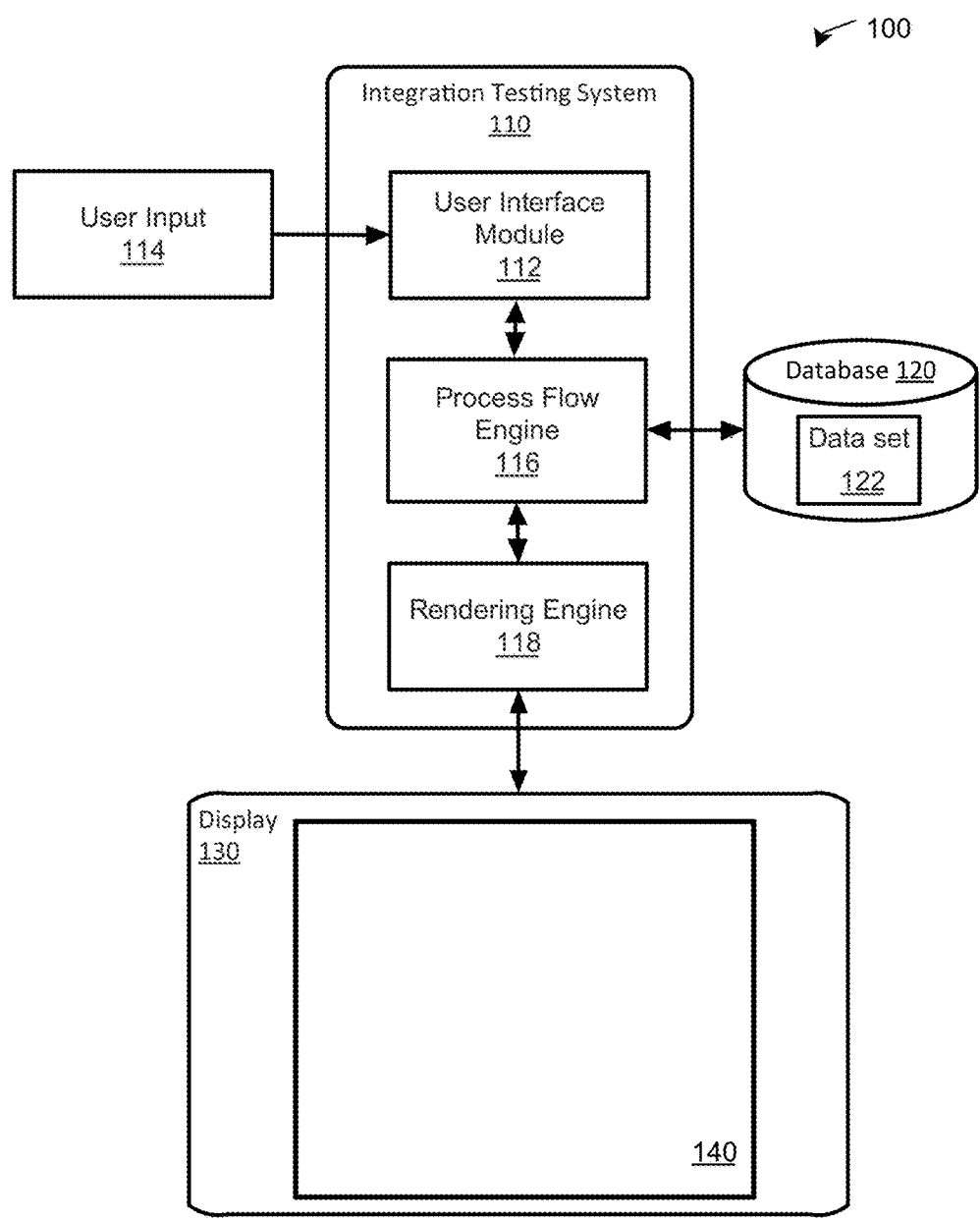
FIG. 1 is a high level illustration of a system for recording and debugging process flows.

FIG. 1 is a high-level block diagram of an exemplary computing system 100 for providing process flow verification and testing. Computing system 100 may be any computing system, such as an enterprise computing environment, client-server system, and the like. Computing system 100 includes integration testing system 110 configured to process data received from a user interface 114, such as a keyboard, mouse, etc., with regard to tracking and recording process flows, verifying and repairing process flow compatibility, detecting errors and anomalies, emulating designated nodes, also referred to an "emulated nodes," such as endpoints, etc. as described herein.

Note that the computing system 100 presents a particular example implementation, where computer code for implementing embodiments may be implemented, at least in part, on a server. However, embodiments are not limited thereto. For example, a client-side software application may implement integration testing system 110, or portions thereof, in accordance with the present teachings without requiring communications between the client-side software application and a server.

In one exemplary implementation, integration testing system 110 may be connected to display 130 configured to display data 140 (e.g. graphical data), for example, to a user thereof. Display 130 may be a passive or an active display, adapted to allow a user to view and interact with data 140 displayed thereon, via user interface 114. In other configurations, display 130 may be a touch screen display responsive to touches, gestures, swipes, and the like for use in interacting with and manipulating data 140 by a user thereof. Gestures may include single gestures, multi-touch gestures, and other combinations of gestures and user inputs adapted to allow a user to introspect, process, convert, model, generate, deploy, maintain, and update data 140.

In other implementations, computing system 100 may include a data source such as database 120. Database 120 may be connected to integration testing system 110 directly or indirectly, for example via a network connection, and may be implemented as a non-transitory data structure stored on a local memory device, such as a hard drive, Solid State Drive (SSD), flash memory, and the like, or may be stored as a part of a Cloud network, such as ORACLE Integration Cloud Service (ICS), as further described herein.

Database 120 may contain data sets 122. Data sets 122 may include data as described herein. Data sets 122 may also include data pertaining to service emulation, actions, values, tracking data, data attributes, data hierarchy, nodal positions, values, summations, algorithms, code (e.g., C++, Javascript, JSON, etc.), security protocols, hashes, and the like. In addition, data sets 122 may also contain other data, data elements, and information such as process flow models, Integration Archives (IAR) files, Uniform Resource Locators (URLs), eXtensible Markup Language (XML), schemas, definitions, files, resources, dependencies, metadata, labels, development-time information, run-time information, configuration information, API, interface component information, library information, pointers, and the like.

Integration testing system 110 may include user interface module 112, process flow engine 116, and rendering engine 118. User interface module 112 may be configured to receive and process data signals and information received from user interface 114. For example, user interface module 112 may be adapted to receive and process data from user input associated with data sets 122 for processing via integration testing system 110.

In an exemplary implementation, process flow engine 116 may be adapted to receive data from user interface 114 and/or database 120 for processing thereof. In one configuration, process flow engine 116 is a software engine configured to receive, record, and process input data from a user thereof pertaining to data 140 from user interface module 114, database 120, external databases, the Internet, ICS, and the like in order to process, test, repair, and validate process flow instances.

Process flow engine 116 may receive existing data sets 122 from database 120 for processing thereof. Such data sets 122 may include and represent a composite of separate data sets 122 and data elements pertaining to, for example, process flows, instance recordings, catalogs, organizational data, which may include employment data, salary data, personnel data, and the like. In addition, data sets 122 may include other types of data, data elements, and information such as contact data, sales data, production data, scientific data, financial data, medical data, census data, and the like.

Process flow engine 116 in other implementations may be configured as a data analysis tool to perform analysis functions associated with data, such as data sets 122. Such analysis functions may include service emulation (e.g., mocking a service), flow compatibility verification, reflection—including introspection, meta-data, properties and/or functions of an object at runtime, recursion, traversing nodes of data hierarchies, determining the attributes associated with the data, determining the type of data, determining the values of the data, determining the relationships to other data, interpreting metadata associated with the data, checking for exceptions, and the like. For example, process flow engine 116 may be configured to receive and analyze recorded process flows from a working environment to determine whether such process flows contain errors and/or anomalies, and to determine whether such errors and/or anomalies are acceptable for another environment instance, revision, etc. within an acceptable error threshold. Moreover, process flow engine 116 may be configured to determine whether to bypass, report, or repair such errors and anomalies as needed in order to test, repair, or reconfigure the other environment instance.

In some implementations, process flow engine 116 provides a multistep flow compatibility verification process including pre-change and post-change processes. For example, prior to committing changes to a project, process flow engine 116 may be configured to provide a flow simulation using a recording to test the new environment before integration. Such simulations may provide feedback of the resources to be added and information and any problems encountered such as broken process flows, undefined services, inaccessible endpoints, malformed resources, missing dependencies, wrong dependency references, system conflicts, and the like. If the process flow engine 116 does not detect an issue, or a waiver from a user pertaining to accepting errors, or an error or anomaly is within a predefined error threshold, process flow 116 may set a "pass" indicator for project. However, if process flow 116 detects that errors or anomalies are not within the acceptable error threshold, then process flow 116 may set a "fail" indicator for the project.

In other scenarios as described further herein, where an environment contains differences relative to a prior or different version of the environment that is being replaced or updated, process flow engine 116 may be employed to analyze, detect, and process such differences. In this scenario, prior to the update or replacement of the older environment, process flow engine 116 is configured to use recorded process flows from a previous validated environment to analyze the differences between the older and new version of the environment to determine if the differences between the environments are beyond a compatibility threshold. If so, then process flow engine 116 may provide a user with a message such as an error warning, alert, and the like, and/or repair such differences in recursive or non-recursive manner until the differences between the older and newer environments are within a compatibility and/or error threshold.

Rendering engine 118 may be configured to receive configuration data pertaining to data 140, associated data sets 122, and other data associated with data sets 122 such as user interface components, icons, user pointing device signals, and the like, used to render data 140 on display 130. In one exemplary implementation, rendering engine 118 may be configured to render 2D and 3D graphical models and simulations to allow a user to obtain more information about data sets 122. In one implementation, upon receiving instruction from a user, for example, through user interface 114, rendering engine 118 may be configured to generate a real-time display of interactive changes being made to data 140 by a user thereof.

Figure 2A:
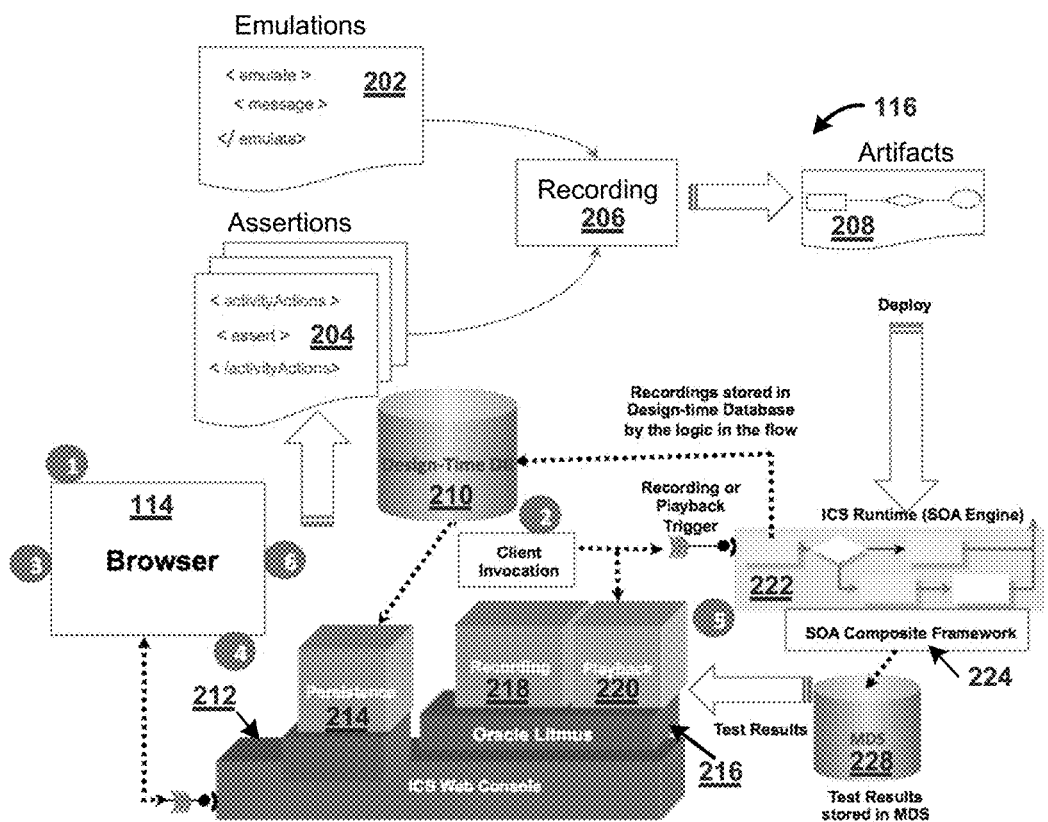
FIGS. 2A-D are high level schematic diagrams depicting a process flow recording and debugging system.
Figure 2B:
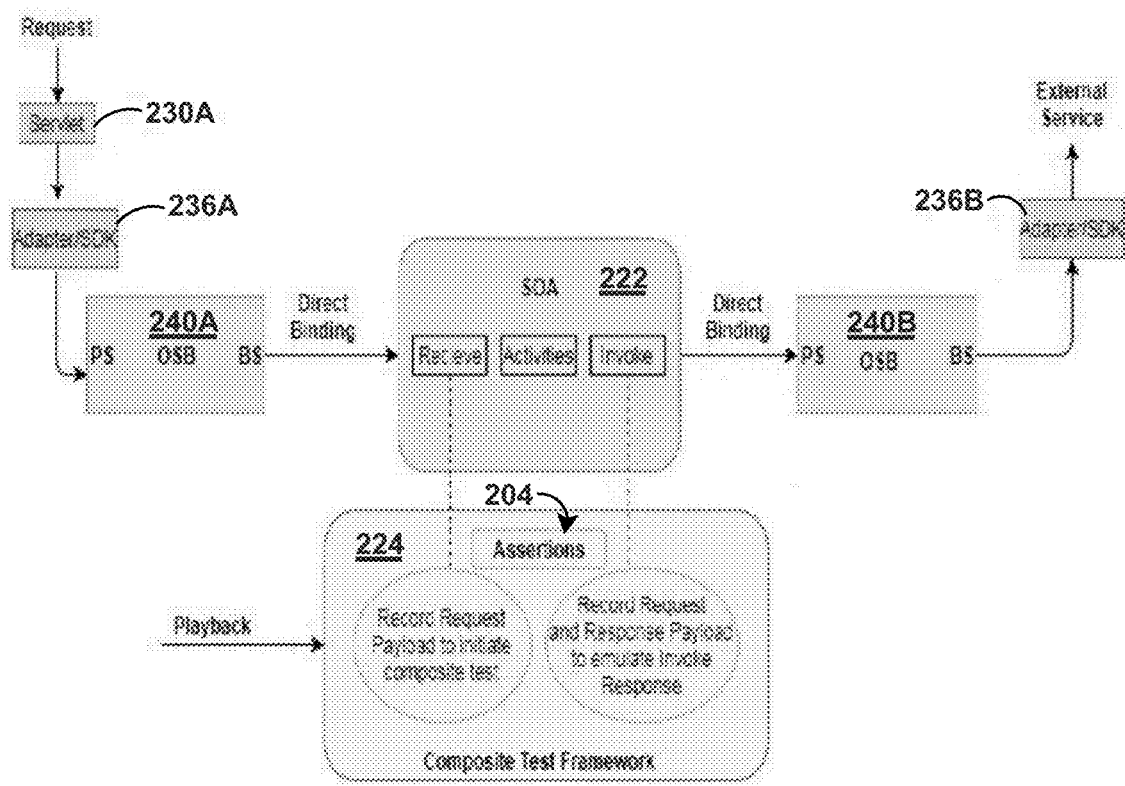
Figure 2C:
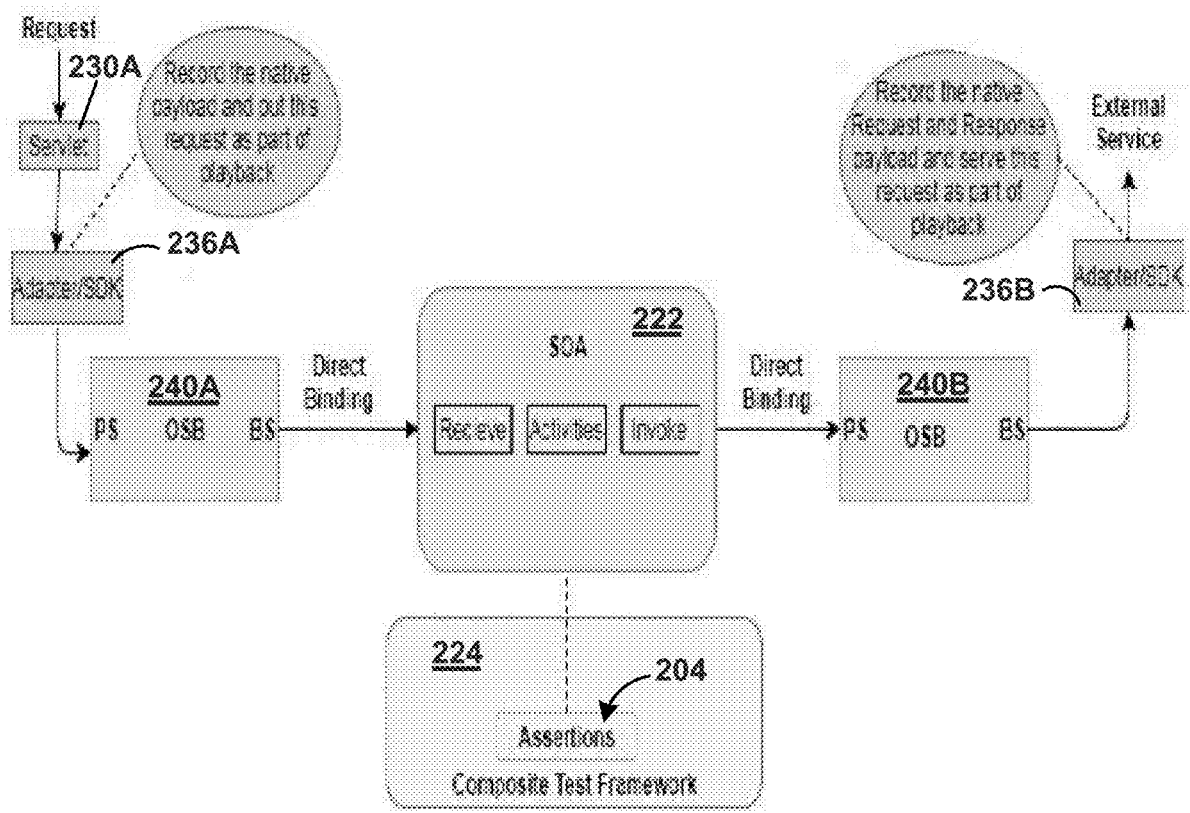
Figure 2D:
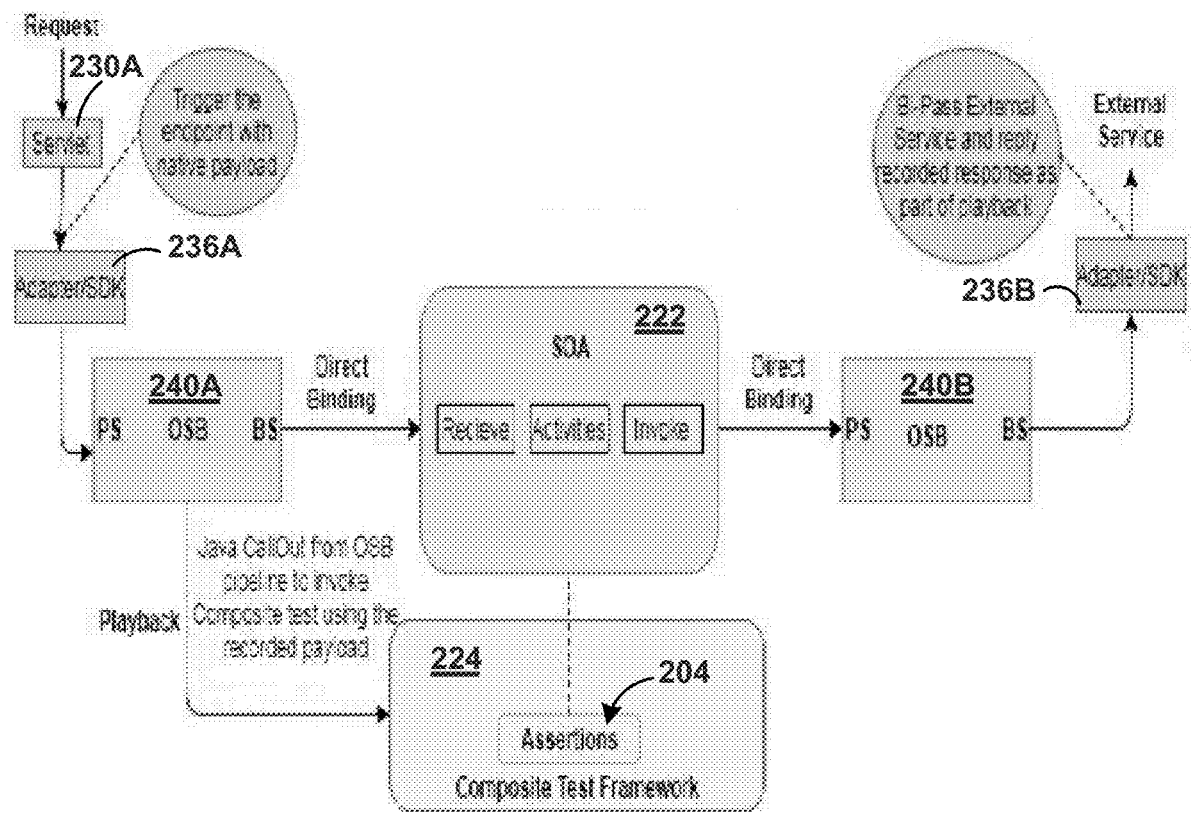

FIGS. 2A-D are high level schematic diagrams depicting an exemplar process flow engine 116 employed to provide functions such as flow recording, testing, debugging, emulation, repairing, and the like. Referring to FIG. 2A, in one implementation at (1) process flow engine 116 receives a command to enable recording for an integration and receives a process flow integration payload, emulations 212, and assertions 204, via user input 114, such as a browser, Representational State Transfer (REST) web service, and the like, which may be instantiated as part of an ICS web console 212. In order to record, process flow engine 116 may receive payloads using, for example, a recording system 206, which may include a recording module 218 instantiated as pat of a layer 216 associated with ICS web console 212.

Emulations may be configured to emulate nodes of the process flow that are designated as inaccessible or otherwise designated for emulation. For example, emulations may be received that emulate designated endpoints, third party adapters, and the like. Emulations may also be configurable to vary the operation of a designated node as part of a stress test operation, operational limit testing, edge case testing, etc. In an example, emulations that emulate adapters, processes, etc., may be configured with different criteria in order to test a new or updated adapters, processes, etc. that have yet to be released for use in the process flow. In other implementations, in addition to and/or in adjunct with emulating an adapter, process, etc., in order to provided input into the emulations, process flow engine 116 may communicate with third party data objects, processes, services, and code, etc., such as adapters, through for example, a separate interface, thereby allowing others, such as suppliers, customers, etc., to provide input into the emulations. Moreover, emulations may be set as mock services to emulate service nodes in order to test services associated with a process flow.

In one implementation, during recording, BPEL may be used to persist the payload in a persistence database 214, such as database 120, and use the persisted payload as part of the composite test. For example, referring to FIG. 2B, a request may be processed via servlet 230A which is then processed via an adapter 236A, Service Development Kit (SDK), etc., and transmitted to engine 222, such as a runtime engine, via a bus, such as Oracle Service Bus (OSB) 240A.

In some implementations, engine 222 may be an ICS instantiation deployed using a Service Oriented Architecture (SOA) enabling, for example, system developers to set up and manage services and to orchestrate them into composite applications, business processes, and the like.

Engine 222 receives the assertions 204 and invokes the record request and response payload to emulate an invoked response of an external service coupled to engine 22 via OSB 240B and adapter 236B. Similarly, referring to FIG. 2C, a native payload may be processed by engine 222. In this scenario, the payload process flow may be recorded, stored, and may be used for playback when requested from, for example, design time database 210, such as database 120.

Referring to FIG. 2A, at (2) a user invokes a recording, or a portion thereof, or playback trigger of a process flow integration for processing by process flow engine 116. In exemplary implementations, the recording or playback may be invoked by a client invocation, or by other similar processing trigger. For example, a user may trigger a dry run of the process flow in a known environment such as engine 222 with emulation 202 and assertions 204 at specified points of the integration, which is then recorded by recording system 206 and processed, for example, by engine 222, to generate processing artifacts 208. Thus, the output of the dry run may be used as a "gold standard" for testing the process flow in a different environment such as a new ICS instantiation, updated instantiation, new release, and the like to capture issues with the different environment instance.

At (3) the recorded process flow integration is provided to another environment instance, such as a different ICS instantiation for testing. The recording may be delivered by virtually any means such as exporting a file and importing the file into another environment. For example, a schema may be employed to receive and process the recording in order to generate data object classes, such as jaxb classes, from the recorded payload and project model and generate test files, such as XML test files.

At (4), a playback of the recorded process flow is initiated, for example, by a user entering a playback command via user input 114. The playback may be processed by playback module 220. For example, referring to FIG. 2D, playback may be initiated by a request received by servlet 230A, which is routed to engine 222 via adapter 236A and OSB 240. OSB 240A may provide the request to engine 222 and invoke a composite test by providing a command to composite test framework 224. Composite test framework provides assertions 204 to engine 222. In implementations, composite test framework 224 may provide test results to test results storage 228, such as database 220, which may then be used to provide such test results to ICS web console 212, for processing, for example, by a user, and/or by a centralized testing service.

At (5) playback module 220 deploys test artifacts from the composite test of the integration to the engine 222, invokes the composite test, and retrieves the results of the tests, for example, from test results storage 228.

At (6) the results of the tests may be analyzed, for example, via presentation to users, using process flow engine 116, and the like. In other implementations, the results of the tests are employed by flow processing engine 116 as a debugging and/or repair process. As such, flow processing engine may use tracing to detect errors and anomalies and then determine whether such errors and/or anomalies are within an error threshold, may be ignored, should be repaired, etc. In implementations, users, such as customers, may present results for internal consumption and/or to third parties, such as the centralized testing system, for further analysis.

Figure 3A:
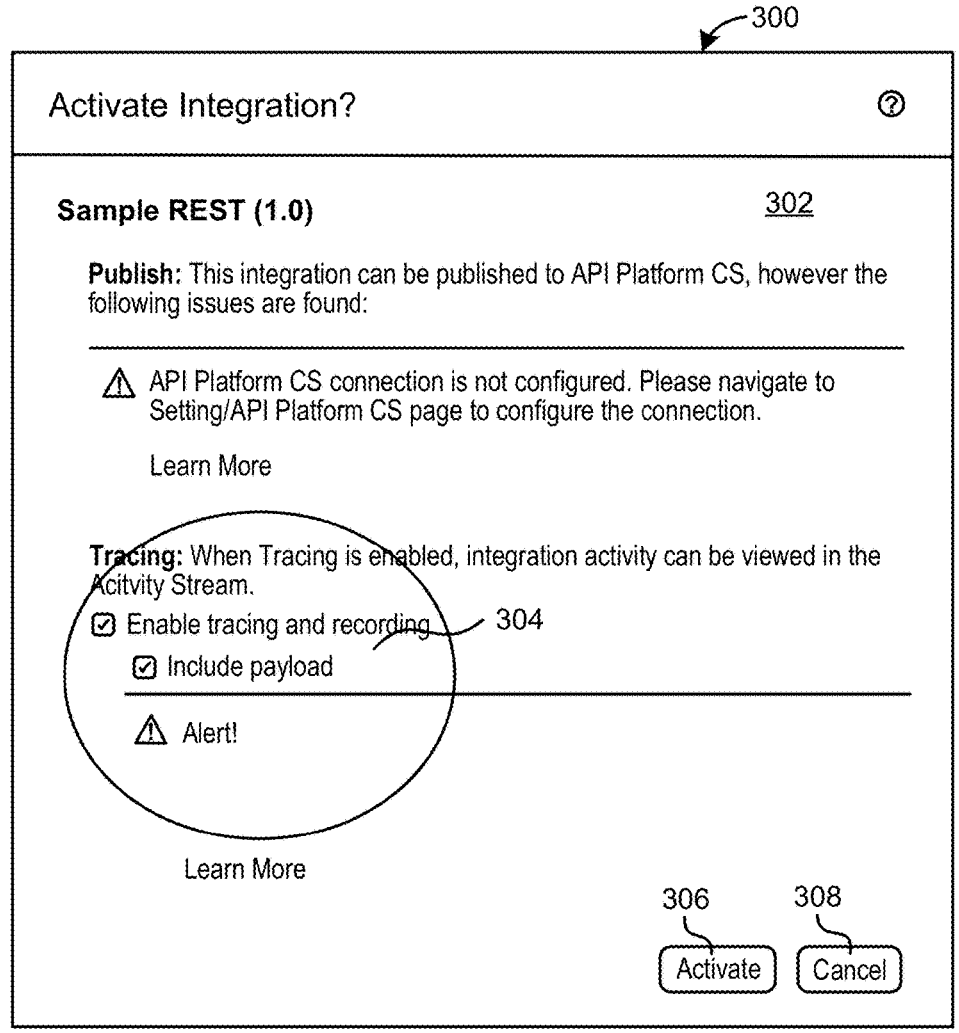
FIGS. 3A-G are high level schematic diagrams depicting a user interface and operations for a process flow recording and debugging system.
Figure 3B:
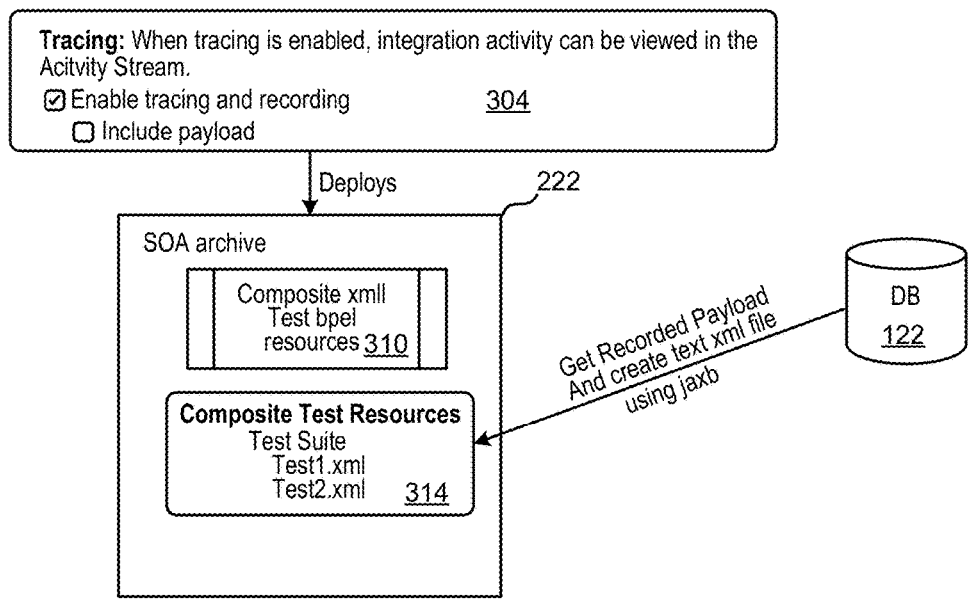
Figure 3C:
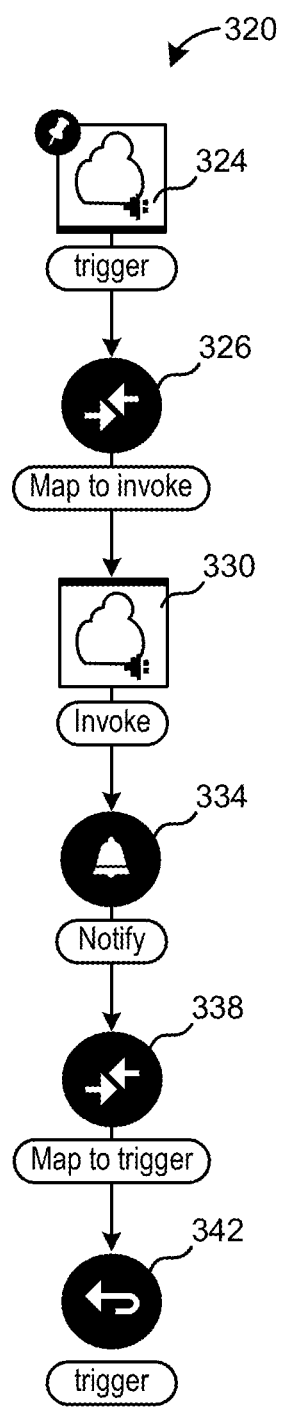

FIGS. 3A-G are high level schematic diagrams depicting a User Interface (UI) 300 and operations for a process flow recording and debugging system. Referring to FIG. 3A, in one implementation, a UI 300 is configured to provide a user with a tracing and publishing interface 302 including a selection function, such as a UI checkbox 304, to enable the recording and/or the tracing of a process flow with or without a payload. In addition, when selected, checkbox 304 allows the user to view integration activity in an activity stream 320 such as illustrated in FIG. 3C, for example, when activate function 306 is activated, or may be canceled when cancel function 308 is selected. FIG. 3C illustrates a display of nodes in a process flow integration 320, illustrating a trigger node 324, map to invoke node 326, invoke node 330, notify node 334, map to trigger node 338, and trigger node 342.

In other implementations, the payload may be selectable as the payload information may introduce sensitive information thereby posing a potential security risk. In addition, the user may select to not include the payload to increase processor efficiency in processing the process flow. In some implementations, in order to adapt to available processing resources a user may also set a level of processing to increase or decrease processor resource efficiency.

Referring to FIG. 3B, selecting function 304 deploys engine 222, which processes an integration process flow (e.g., test BPEL) using composite test resources 310. Engine 222 retrieves a recorded payload creating a test file by employing composite test resources 314. For example, engine 222 may retrieve a recorded payload process flow from database 122 and generate test files, e.g., XML files using Java Architecture for XML binding (JAXB).

Figure 3D:
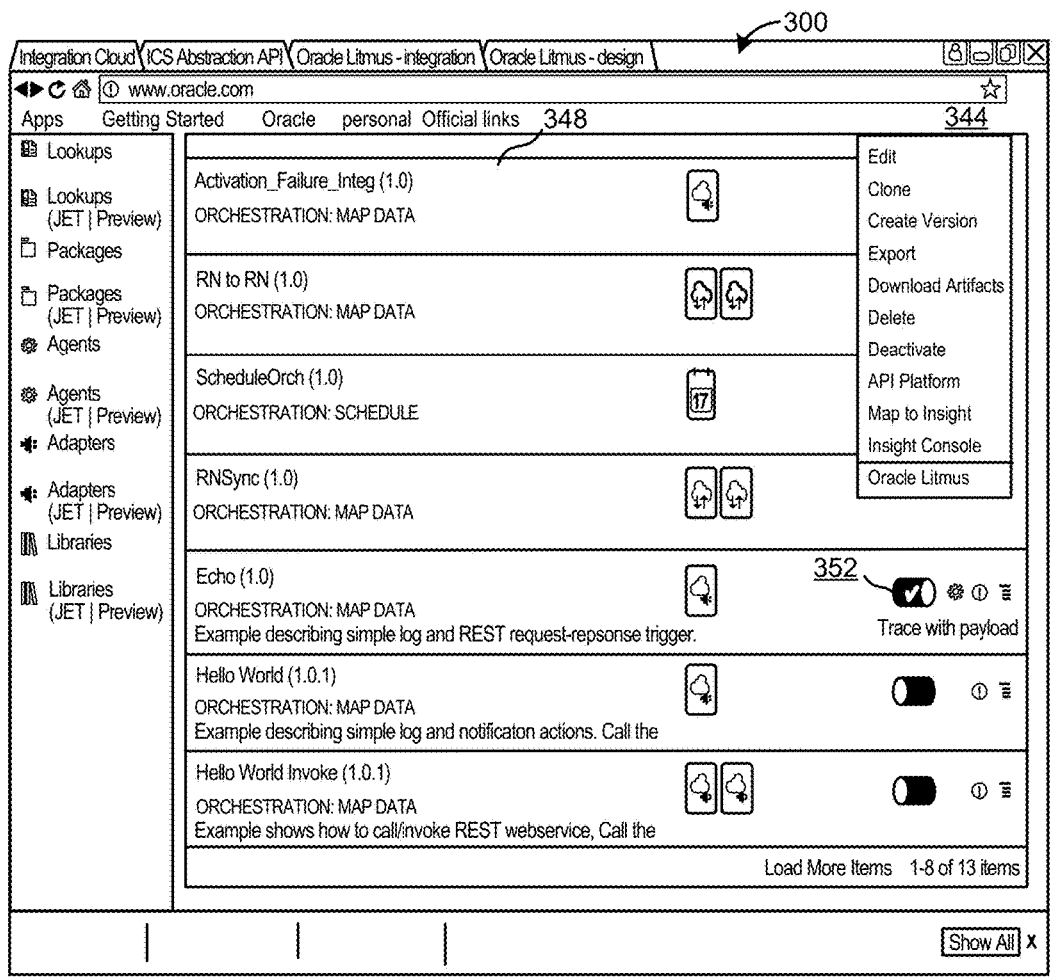

Referring to FIGS. 3D-3G. As illustrated in FIG. 3D, in an implementation, UI 300 is employed to provide a user with an integration interface 344 for activating process flow engine 116. Integration interface 344 may be configured to initiate and view integration process flow as described herein. For example, integration interface 344 may provide a listing 348 of process flow points and associated data, such as ICS instances, adapter functions, orchestration map data, orchestration map schedules, request-response triggers, notifications, and the like. In addition, a listing 348 may include a trace with payload selection 352 to provide a user with the ability to trace with or without a payload.

Figure 3E:
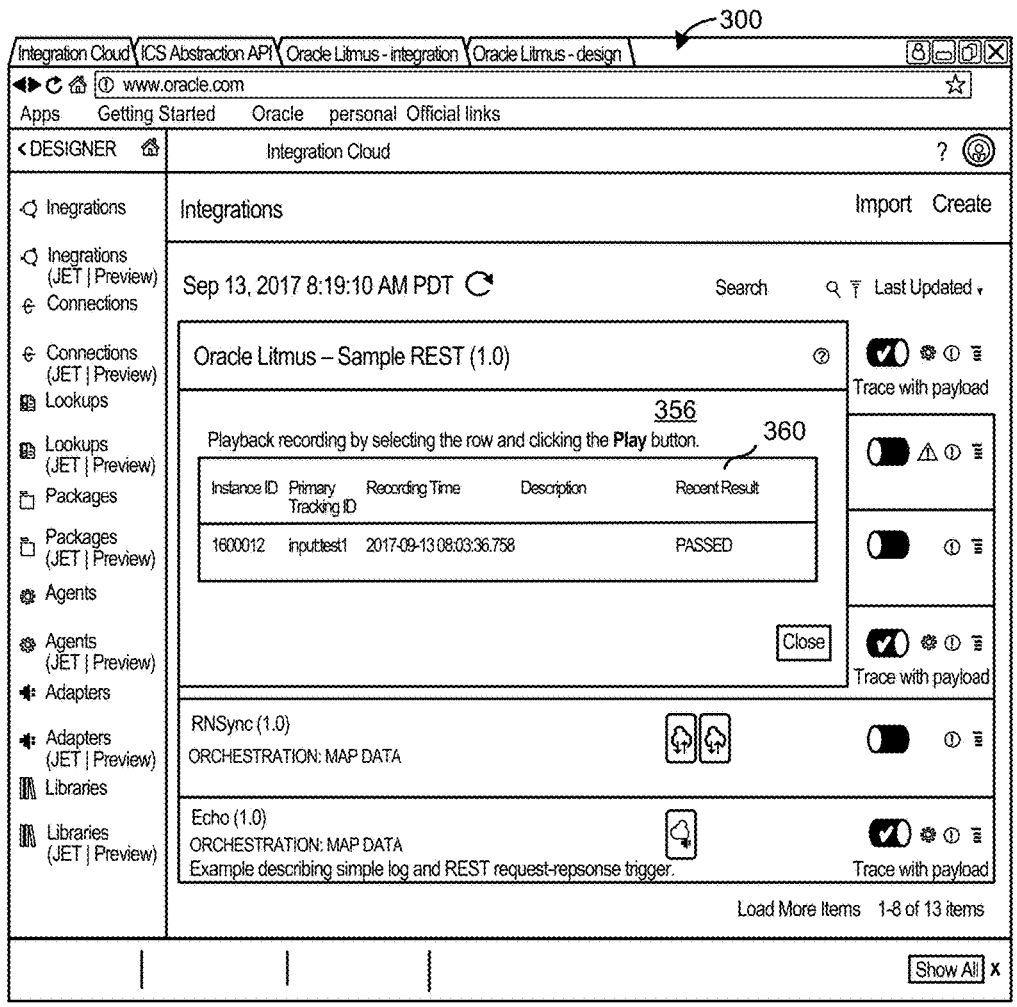
Figure 3F:
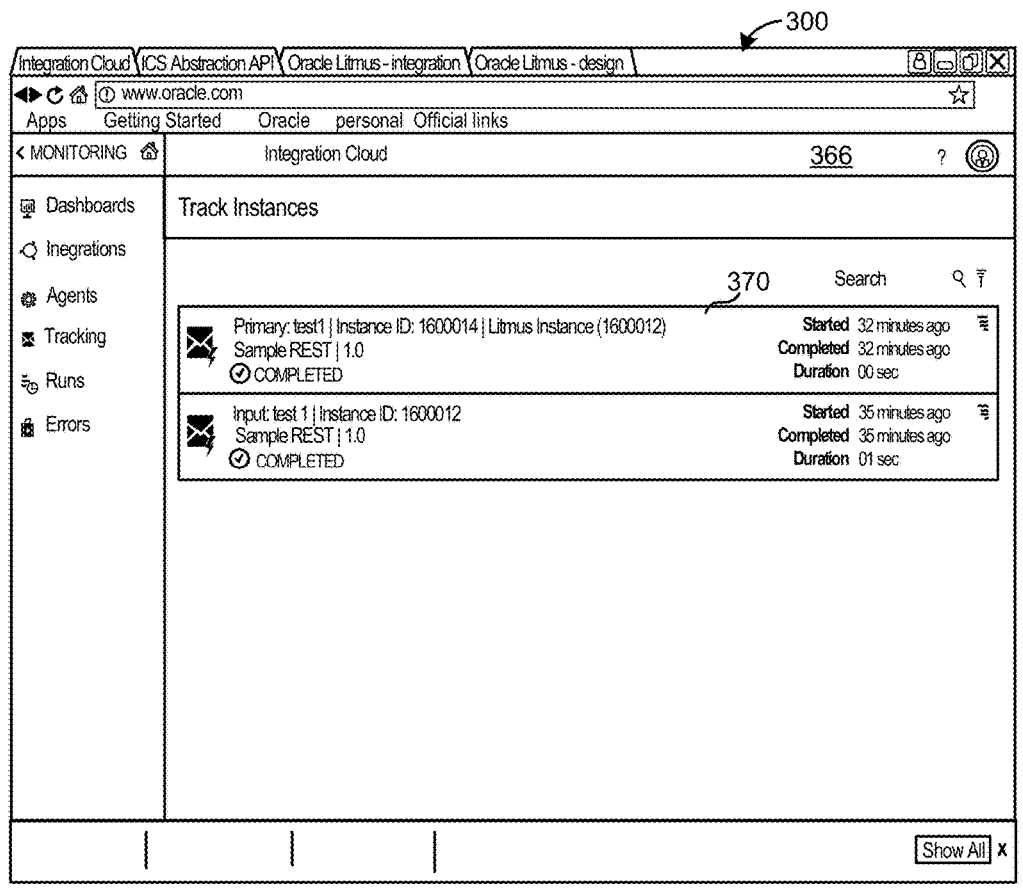

As illustrated in FIG. 3E, UI 300 may be used to provide a recording playback interface 356, which provides the user a listing 360 of one or more recording instances, recorded, for example, using process flow engine 116 as described herein. As shown in FIG. 3F, UI 300 may be configured with a track instance interface 366. Track interface 366 may be configured to track one or more test instances 370 for use in error and anomaly detection, endpoint emulation, process repair, stress testing, etc.

Figure 3G:
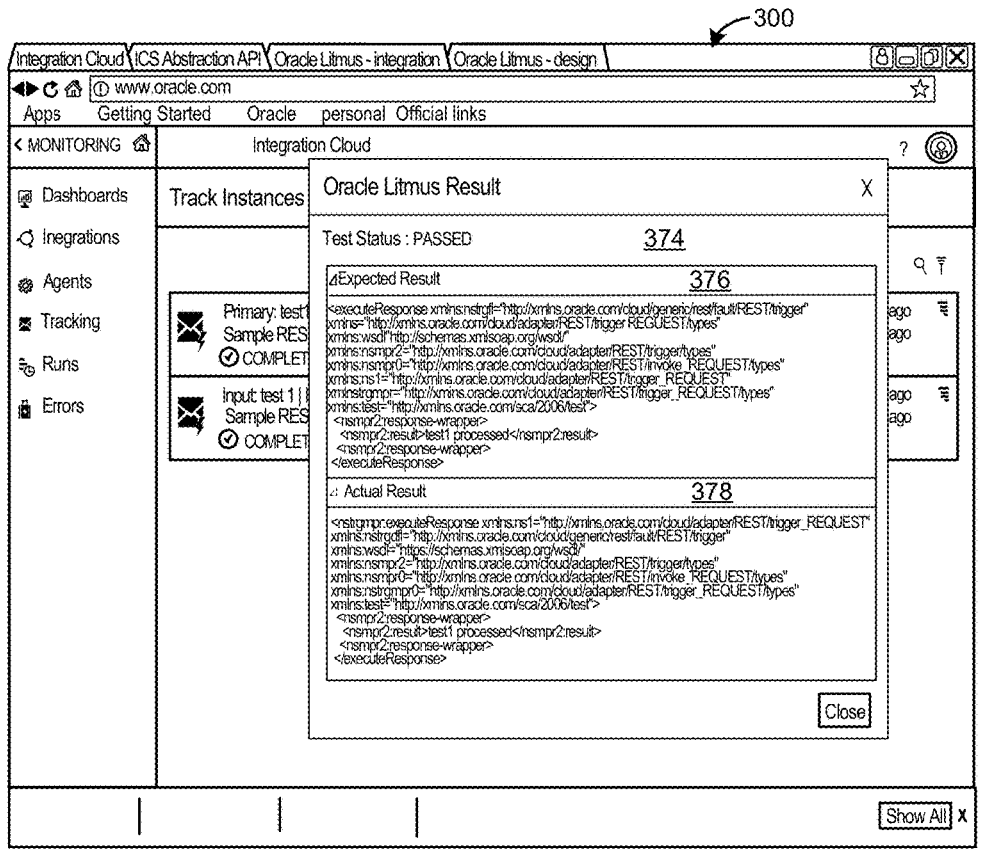

For example, FIG. 3G illustrates a test results interface 374. In one implementation, test results interface 374 provides a display output showing expected results 376 and actual results 378. For example, process flow engine 116 may be employed to run a test of a recorded process flow integration using emulation of designated points and then run the same process flow integration in a different environment instance.

In one implementation, test results interface 374 provides an output with respect to error tolerance thresholds. As an example, process flow engine 116 may be set to ignore issues with text use, such as case font, spacing between letters, colon use, and the like, and therefore the resulting test flow may look different, but be acceptable for use in the different environment. In this scenario, process flow engine 116 may be set to ignore issues that are designated as acceptable, benign, or otherwise ignorable. As such, tailoring process test acceptance allows the system to process issues that are designated as important, thereby increasing processor efficiency.

Figure 4:
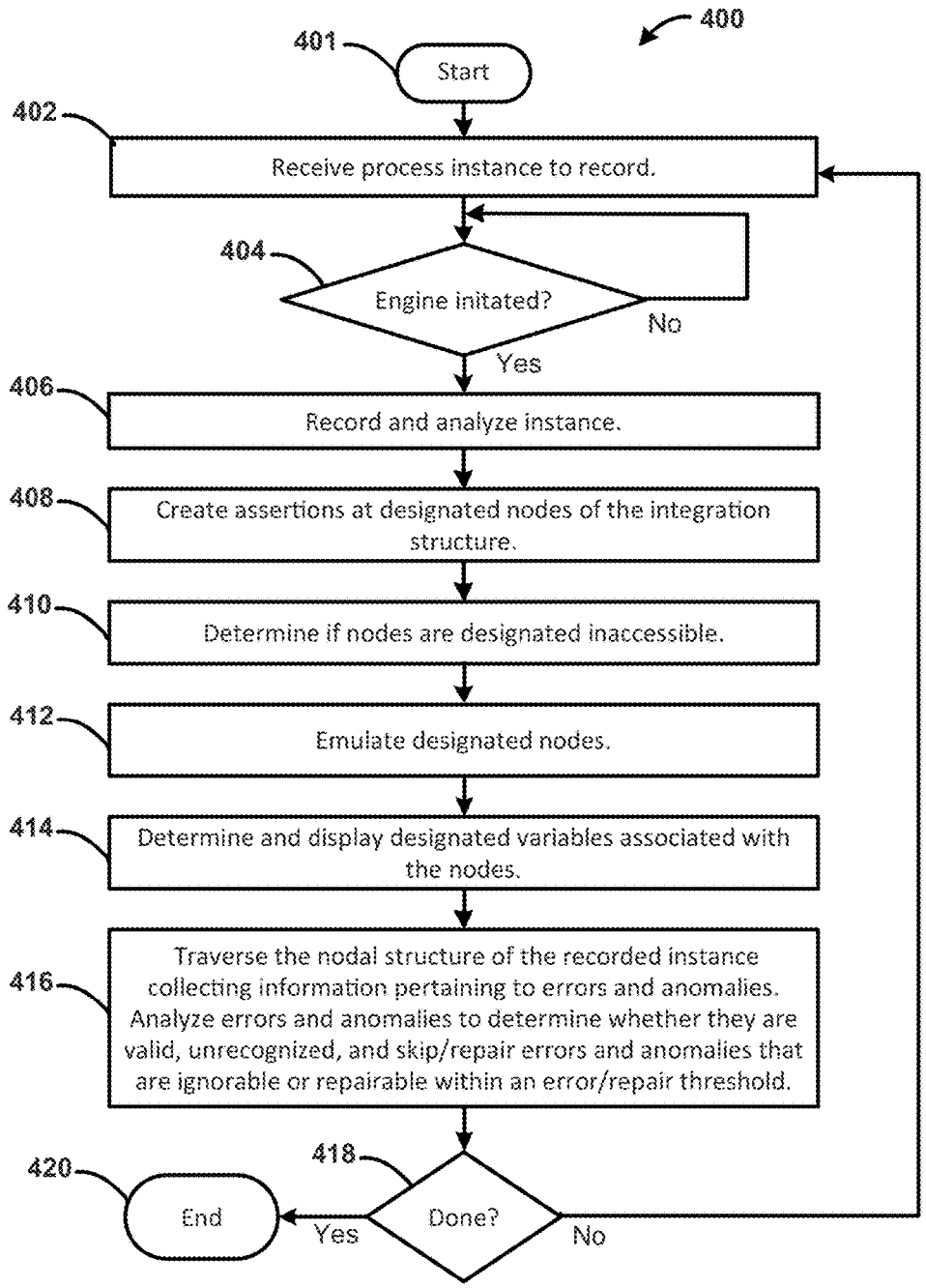
FIG. 4 is a flow diagram of an example method adapted for use with implementations, and variations thereof, illustrated in FIGS. 1-3.

FIG. 4 is a flow diagram of an example method 400 adapted for use with implementations, and variations thereof, for example, as illustrated in FIGS. 1-3. As illustrated, method 400 performs steps used to record, analyze, test, and repair process flow integrations.

At 402, method 400 retrieves one or more flow process instances to record. At 404, method determines if a process engine, such as process flow engine 116 is initiated. For example, as discussed supra, process flow engine 116 receives a trigger to record a process flow, which then may be provided to engine 222 for processing in a first environment.

At 406, method 400 records and analyzes a process flow instance. In an example, as illustrated in FIGS. 3A-3G, an integration instance may be recorded and stored in database 120 for playback. Method 400 receives the recorded instance and analyzes the instance to determine a nodal structure of the instance for applying assertions and emulations.

At 408, assertions may be created for application to designated nodes of the process flow. For example, to stress test a particular service, method 400 may generate a series of requests to establish a test to determine the number of assertions the process flow can handle within a test limit.

At 410, method 400 determines if any of the nodes are nodes that are designated as inaccessible nodes (e.g., not accessible or serviceable). For example, if the integration invokes endpoints, method 400 determine whether such endpoints are designated as accessible or not accessible. Accessibility may be established, for example, by method 400 probing nodes to determine whether nodes are set to be inaccessible, represent services that integration testing system 100 cannot connect to, etc.

At 412, method 400 emulates at least some of the nodes designated for emulation. Emulations may be controllable by a user and include emulating functions identical or nearly identical to the functions of the node, or may be configured to offer a range of functions to test different aspects of the nodes. For example, method 400 may bypass endpoints that are not accessible and simulate those nodes to allow the testing to be completed. As such, users can use such emulation to test without having access to real endpoints and during upgrades sometimes with the help of assertions. Further, method 400 may be configured to emulate services associated with nodes in a manner that mocks such services, e.g., "mock services," that may or may not be accessible, such as during process flow testing, recording, etc.

At 414, method 400 determines which of the designated nodes to display. For example, as discussed supra, FIG. 3C provides a visual display of a recorded process flow integration instance 320 under test, providing users with access to different nodes of the process flow.

At 416, method 400 traverses the nodal structure of the recorded instance collecting information pertaining to errors and anomalies. Analyze errors and anomalies to determine whether they are valid, unrecognized, and skip/repair errors and anomalies that are ignorable or repairable within an error/repair threshold. For example, after processing in known environment, recorded process flow integration instance 320 may be processed by process flow engine 116 in a new environment in order to detect errors and anomalies associated with the new environment which then may be reported, ignored, and/or repaired as needed.

At 418, method 400 determines whether the processing is finished. If so, method 400 proceeds to 420 and ends. If not complete, method 400 returns to 402.

Figure 5:
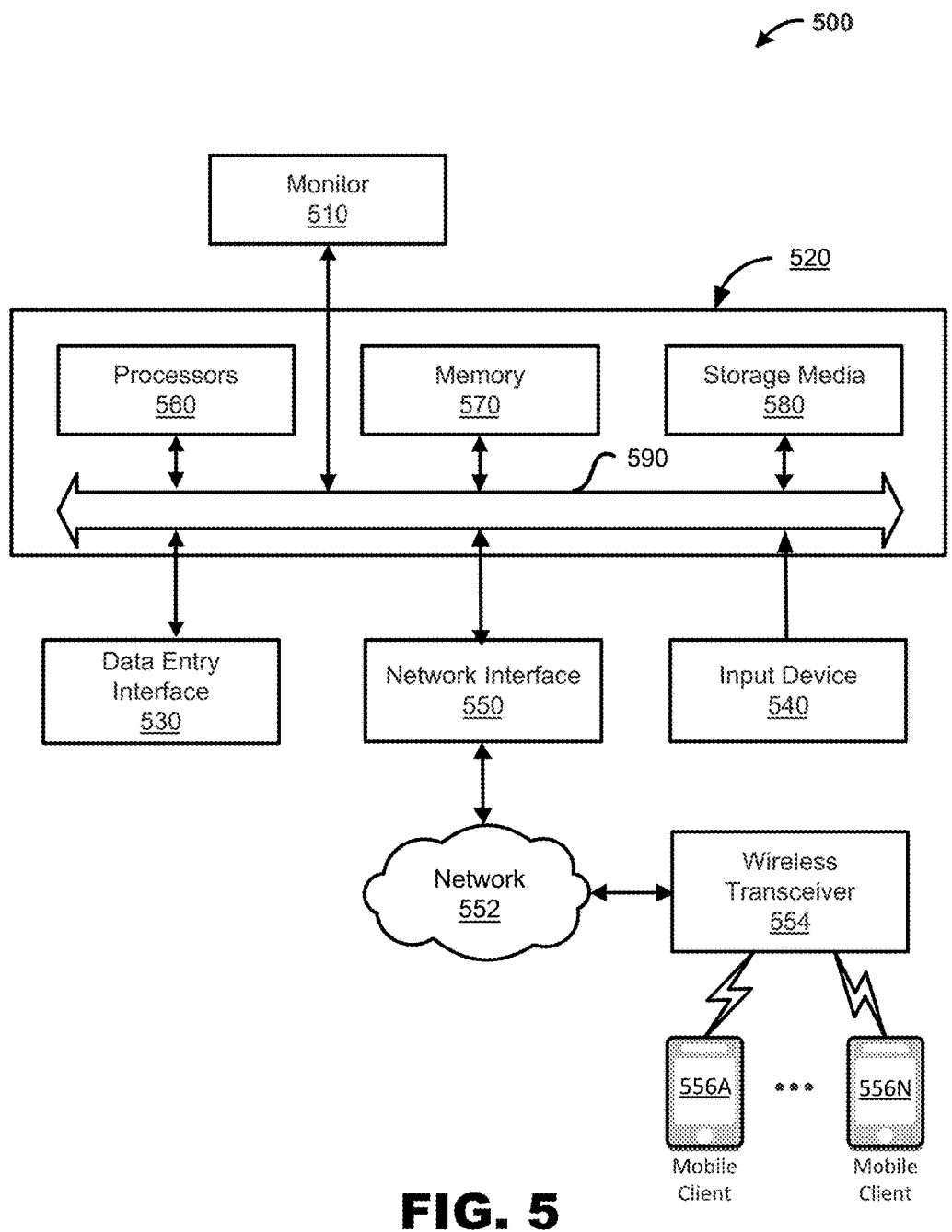
FIG. 5 is a high-level block diagram of an exemplary computer and communication system.

FIG. 5 is a block diagram of an exemplary computer system 500 for use with implementations described in FIGS. 1-4. Computer system 500 is merely illustrative and not intended to limit the scope of the claims. One of ordinary skill in the art would recognize other variations, modifications, and alternatives. For example, computer system 500 may be implemented in a distributed client-server configuration having one or more client devices in communication with one or more server systems.

In one exemplary implementation, computer system 500 includes a display device such as a monitor 510, computer 520, a data entry device 530 such as a keyboard, touch device, and the like, a user input device 540, a network communication interface 550, and the like. User input device 540 is typically embodied as a computer mouse, a trackball, a track pad, wireless remote, tablet, touch screen, and the like. Moreover, user input device 540 typically allows a user to select and operate objects, icons, text, characters, and the like that appear, for example, on the monitor 510.

Network interface 550 typically includes an Ethernet card, a modem (telephone, satellite, cable, ISDN), (asynchronous) digital subscriber line (DSL) unit, and the like. Further, network interface 550 may be physically integrated on the motherboard of computer 520, may be a software program, such as soft DSL, or the like.

Computer system 500 may also include software that enables communications over communication network 552 such as the HTTP, TCP/IP, RTP/RTSP, protocols, wireless application protocol (WAP), IEEE 802.11 protocols, and the like. In addition to and/or alternatively, other communications software and transfer protocols may also be used, for example IPX, UDP or the like.

Communication network 552 may include a local area network, a wide area network, a wireless network, an Intranet, the Internet, a private network, a public network, a switched network, or any other suitable communication network, such as for example Cloud networks. Communication network 552 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 552 may communicate to one or more mobile wireless devices 556A-N, such as mobile phones, tablets, and the like, via a base station such as wireless transceiver 554.

Computer 520 typically includes familiar computer components such as one or more processors 560, and memory storage devices, such as memory 570, e.g., random access memory (RAM), storage media 580, and system bus 590 interconnecting the above components. In one embodiment, computer 520 is a PC compatible computer having multiple microprocessors, graphics processing units (GPU), and the like. While a computer is shown, it will be readily apparent to one of ordinary skill in the art that many other hardware and software configurations are suitable for use with the present invention.

Memory 570 and Storage media 580 are examples of non-transitory tangible media for storage of data, audio/video files, computer programs, and the like. Other types of tangible media include disk drives, solid-state drives, floppy disks, optical storage media such as CD-ROMS and bar codes, semiconductor memories such as flash drives, flash memories, read-only-memories (ROMS), battery-backed volatile memories, networked storage devices, Cloud storage, and the like.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer readable medium including one or more instructions executable by one or more processors for:
   receiving a process flow integration instance;
   determining which nodes of the process flow integration instance to emulate;
   processing the integration in a first environment instance which includes at least one emulated node;
   recording a portion of the process flow integration instance as a data recording;
   establishing a first error threshold for the process flow integration instance with respect to the first environment instance;
   processing the data recording in a second environment which includes at least one other emulated node;

determining errors and anomalies from the process flow integration process with respect to the second environment; and determining whether the errors and the anomalies are within the first error threshold.

2. The computer readable medium of claim 1, further comprising using a mock service to emulate the at least one emulated node.

3. The computer readable medium of claim 1, further comprising bypassing at least one inaccessible node and emulating a function of the inaccessible node.

4. The computer readable medium of claim 1, wherein determining errors and anomalies further comprises determining whether an error is repairable.

5. The computer readable medium of claim 1, wherein determining errors and anomalies further comprises determining whether an error is ignorable.

6. The computer readable medium of claim 1, further comprising recursively repairing at least some of the errors until the errors are within the first error threshold.

7. A computer implemented method comprising:
receiving a process flow integration instance;
determining which nodes of the process flow integration instance to emulate;
processing the integration in a first environment instance which includes at least one emulated node;
recording a portion of the process flow integration instance as a data recording;
establishing a first error threshold for the process flow integration instance with respect to the first environment instance;
processing the data recording in a second environment which includes at least other emulated node;
determining errors and anomalies from the process flow integration process with respect to the second environment; and
determining whether the errors and the anomalies are within the first error threshold.

8. The method of claim 7, further comprising using a mock service to emulate at the at least one emulated node.

9. The method of claim 7, further comprising bypassing at least one inaccessible node and emulating a function of the inaccessible node.

10. The method claim 7, wherein determining the errors and anomalies further comprises determining whether an error is repairable.

11. The method of claim 7, wherein determining the errors and anomalies further comprises determining whether an error is ignorable.

12. The method of claim 7, further comprising recursively repairing at least some of the errors until the errors are with the first error threshold.

13. An apparatus comprising:
one or more processors; and
logic encoded in one or more tangible media for execution by the one or more processors and when executed operable to:
receive a process flow integration instance;
determine which nodes of the process flow integration instance to emulate;
process the integration in a first environment instance which includes at least one emulated node;
record a portion of the process flow integration instance as a data recording;
establish a first error threshold for the process flow integration instance with respect to the first environment instance;
process the data recording in a second environment which includes at least one other emulated node;
determine errors and anomalies from the process flow integration process with respect to the second environment; and
determine whether the errors are within the first error threshold.

14. The apparatus of claim 13, further comprising using a mock service to emulate at the at least one emulated node.

15. The apparatus of claim 13, further comprising bypassing at least one inaccessible node and emulating a function of the inaccessible node.

16. The apparatus of claim 13, wherein determining the errors and anomalies further comprises determining whether an error is repairable.

17. The apparatus of claim 13, wherein determining the errors and anomalies further comprises determining whether an error is ignorable.

* * * * *